United States Patent
Hammad et al.

(10) Patent No.: US 11,183,700 B2
(45) Date of Patent: Nov. 23, 2021

(54) ION EXCHANGE MEMBRANE FOR A REDOX FLOW BATTERY

(71) Applicant: SAUDI ARABIAN OIL COMPANY, Dhahran (SA)

(72) Inventors: Ahmad D. Hammad, Dhahran (SA); Issam T. Amr, Khobar (SA); Garba O. Yahaya, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 53 days.

(21) Appl. No.: 16/571,923

(22) Filed: Sep. 16, 2019

(65) Prior Publication Data
US 2021/0083309 A1   Mar. 18, 2021

(51) Int. Cl.
*H01M 8/18* (2006.01)
*H01M 8/0444* (2016.01)
*H01M 8/1025* (2016.01)

(52) U.S. Cl.
CPC ......... *H01M 8/18* (2013.01); *H01M 8/04477* (2013.01); *H01M 8/1025* (2013.01)

(58) Field of Classification Search
CPC ... H01M 8/18; H01M 8/1025; H01M 8/04477
See application file for complete search history.

(56) References Cited

U.S. PATENT DOCUMENTS

| | | | |
|---|---|---|---|
| 7,534,515 B2 | 5/2009 | Nam et al. | |
| 7,592,086 B2 | 9/2009 | Choi et al. | |
| 8,092,952 B2 | 1/2012 | Hwang et al. | |
| 8,203,028 B2 | 6/2012 | Kulprathipanja et al. | |
| 8,486,579 B2 | 7/2013 | Huang et al. | |
| 9,123,923 B2 | 9/2015 | Zhang et al. | |
| 9,559,375 B2 | 1/2017 | Savinell et al. | |
| 10,058,823 B2 | 8/2018 | Weber et al. | |
| 10,084,220 B2 | 9/2018 | Zhamu et al. | |
| 10,189,943 B2 | 1/2019 | Weber et al. | |
| 10,226,056 B2 | 3/2019 | Briggs et al. | |
| 2003/0219640 A1 | 11/2003 | Nam et al. | |
| 2007/0092773 A1* | 4/2007 | Guo | H01M 8/1011 429/442 |
| 2008/0221325 A1* | 9/2008 | Pan | C08J 5/2256 544/299 |
| 2012/0077067 A1* | 3/2012 | Li | H01M 50/411 429/107 |
| 2014/0008585 A1 | 1/2014 | Wu | |
| 2014/0227574 A1* | 8/2014 | Savinell | H01M 10/38 429/107 |
| 2014/0251897 A1 | 9/2014 | Livingston et al. | |
| 2016/0158707 A1 | 6/2016 | Heijnen et al. | |
| 2017/0239627 A1 | 8/2017 | Weber et al. | |
| 2018/0056245 A1 | 3/2018 | Konradi et al. | |
| 2019/0067725 A1* | 2/2019 | Wainright | H01M 4/8657 |

FOREIGN PATENT DOCUMENTS

| | | |
|---|---|---|
| CN | 101475699 A | 7/2009 |
| CN | 102544541 A | 7/2012 |
| CN | 104332576 A | 2/2015 |
| CN | 105826580 A | 8/2016 |
| EP | 2650947 A1 | 10/2013 |
| EP | 2796592 A1 | 10/2014 |
| KR | 1020130060159 | 6/2013 |
| KR | 20160091154 A | 8/2016 |
| WO | 2010086332 A1 | 8/2010 |
| WO | 2014018615 A1 | 1/2014 |
| WO | 2014095717 A1 | 6/2014 |
| WO | 2016171486 A1 | 10/2016 |
| WO | 2019050272 A1 | 3/2019 |

OTHER PUBLICATIONS

Dai et al., "SPEEK/Graphene oxide nanocomposite membranes with superior cyclability for highly efficient vanadium redox flow battery", Journal of Materials Chemistry A, 2014, pp. 12423-12432, The Royal Society of Chemistry.

Lim et al., "Sulfonated poly(ether ether ketone)/poly(ether sulfone) composite membranes as an alternative proton exchange membranes in microbial fuel cells", International Journal of Hydrogen Energy, 2012, pp. 11409-11424, Elsevier.

Luo et al., "Preparation and characterization of Nafion/SPEEK layered composite membrane and its application in vanadium redox flow battery", Journal of Membrance Science, 2008, pp. 553-558, Elsevier B.V.

Merle et al., "Friedel-Crafts Crosslinked Highly Sulfonated Polyether Ether Ketone (SPEEK) Membranes for a Vanadium/Air Redox Flow Battery", Membranes, 2014, pp. 19.

Prifti et al., "Membranes for Redox Flow Battery Applications", Membranes, 2012, pp. 275-306.

(Continued)

*Primary Examiner* — Muhammad S Siddiquee
(74) *Attorney, Agent, or Firm* — Bracewell LLP; Constance Gall Rhebergen (57) ABSTRACT

Embodiments provide a redox flow battery, an ion exchange membrane for use in the redox flow battery and a method for producing the ion exchanger membrane. The ion exchange membrane includes a base layer, a first hydrophobic layer, and a second hydrophobic layer. The base layer includes sulfonated poly(ether ether ketone). The base layer has a first surface and a second surface. The first hydrophobic layer includes a polydimethylsiloxane elastomer. The first hydrophobic layer is positioned on the first surface of the base layer. The second hydrophobic layer includes the polydimethylsiloxane elastomer. The second hydrophobic layer is positioned on the second surface of the base layer. The ion exchange membrane is configured to prevent cross contamination of the first electrolyte and the second electrolyte. The redox flow battery includes a first half-cell, a second half-cell, and the ion exchange membrane. The first half-cell includes a first electrolyte. The second half-cell includes a second electrolyte. The first half-cell and the second half-cell are configured to undergo a redox reaction to discharge and charge the redox flow battery.

12 Claims, 5 Drawing Sheets

(56) References Cited

OTHER PUBLICATIONS

Yu et al., "Durable and Efficient PTFE Sandwiched SPEEK Memebrane for Vanadium Flow Batteries", Applied Materials & Interfaces, 2016, pp. 23425-23430, American Chemical Society.
Chuanyu et al., "A Comparative Study of Nafion and Sulfonated Poly(ether ether ketone) Membrane Performance for Iron-Chronium Redox Flow Batterry", Ionics 25, 2019, pp. 4219-4229.
KR1020130060159 English Abstract, Publication Date of Jun. 7, 2013, 1 page.
PCT ISR issued in the prosecution of International Application PCTUS2020/051108, dated Nov. 26, 2021, 11 pages.
WO2019050272 Espacenet English Abstract, Publication Date of Mar. 14, 2019, 1 page.
Zhang et al., "Branched Sulfonated Polyimide/functionalized Silicon Carbide Composite Membranes With Improved Chemical Stabilities and Proton Selectivities for Vanadium Redox Flow Battery Application", J. Mater Sci 53, 2018, pp. 14506-14524.

* cited by examiner

ION EXCHANGE MEMBRANE FOR A REDOX FLOW BATTERY

BACKGROUND

Field of the Disclosure

Embodiments of the disclosure generally relate to a redox flow battery. More specifically, embodiments of the disclosure relate to a device and method for an ion exchange membrane used in a redox flow battery.

Description of the Related Art

A redox flow battery (RFB) is an electrochemical storage device where one or more electrolytes containing dissolved electroactive materials flow through an electrochemical cell that reversibly converts chemical energy to electrical energy. Chemical energy is converted to electrical energy via a reversible reduction-oxidation (redox) reaction. Conversely, one or more discharged electrolytes can be flowed through the electrochemical cell such that electrical energy is converted to chemical energy due to the reversible nature of the redox reaction. The electroactive materials used in an RFB generally include metal cations of various oxidation states that are stored in external electrolyte reservoirs and introduced or circulated into the electrochemical cell. Because the redox reaction is reversible, the electrolyte can be charged without replacing the electroactive material. For example, the RFB can be charged by replacing the electrolyte solution while recovering the spent electroactive material for regeneration. Accordingly, the energy capacity of the redox flow battery depends on the volume of the electrolyte solution, for example, the size of the external electrolyte reservoir.

An example RFB that received significant attention is the vanadium redox flow battery (VRFB) due to its long lifespan, capacity, flexible design, and safety. The VRFB is an RFB that uses vanadium ions of various oxidation states to store chemical energy. For example, one type of VRFB uses vanadium ions existing in four different oxidation states, vanadium(II), vanadium(III), vanadium(IV), and vanadium(V). Because vanadium(V) is prone to oxidation when used as an electrolyte for the VRFB, the choices for selecting a suitable ion exchange membrane (IEM) are quite limited. For example, perfluorosulfonic acid polymers such as Nafion® are commonly used as IEMs for VRFBs due to their proton conductivity and their chemical stability to vanadium(V). However, these perfluorosulfonic acid polymer-based membranes suffer from ion selectivity, swelling upon exposure to water, and cost. Moreover, the use of vanadium(V) as the electrolyte limits the operational temperature of the VRFB between 10 to 40 deg. C. where vanadium(V) suffers from thermal precipitation at temperatures greater than 40 deg. C.

SUMMARY

Embodiments of the disclosure generally relate to a redox flow battery. More specifically, embodiments of the disclosure relate to a device and method for an ion exchange membrane used in a redox flow battery.

Embodiments of the disclosure provide a redox flow battery. The redox flow battery includes a first half-cell, a second half-cell, and an ion exchange membrane. The first half-cell includes a first electrolyte. The second half-cell includes a second electrolyte. The first half-cell and the second half-cell are configured to undergo a redox reaction to discharge and charge the redox flow battery. The ion exchanger membrane includes a base layer, a first hydrophobic layer, and a second hydrophobic layer. The base layer includes sulfonated poly(ether ether ketone). The base layer has a first surface and a second surface. The first hydrophobic layer includes a polydimethylsiloxane elastomer. The first hydrophobic layer is positioned on the first surface of the base layer. The second hydrophobic layer includes the polydimethylsiloxane elastomer. The second hydrophobic layer is positioned on the second surface of the base layer. The ion exchange membrane is configured to prevent cross contamination of the first electrolyte and the second electrolyte.

In some embodiments, the first electrolyte includes $Fe^2$. In some embodiments, the $Fe^{2+}$ has a concentration ranging from 0.5 molar (M) to 2.5 M. In some embodiments, the first electrolyte has a pH of less than 2.

In some embodiments, the second electrolyte includes $V^{3+}$. In some embodiments, the $V^{3+}$ has a concentration ranging from 0.5 M to 2.5 M. In some embodiments, the second electrolyte has a pH of less than 2.

In some embodiments, the redox flow battery further includes a first electrolyte reservoir and a second electrolyte reservoir. The first electrolyte reservoir is fluidly connected to the first half-cell such that the first electrolyte is circulated between the first electrolyte reservoir and the first half-cell. The second electrolyte reservoir is fluidly connected to the second half-cell such that the second electrolyte is circulated between the second electrolyte reservoir and the second half-cell.

In some embodiments, the redox flow battery provides an electric potential ranging from 0.5 V to 2.5 V during discharge.

Embodiments of the disclosure also provide an ion exchange membrane for use in a redox flow battery. The ion exchange membrane includes a base layer, a first hydrophobic layer, and a second hydrophobic layer. The base layer includes sulfonated poly(ether ether ketone). The base layer has a first surface and a second surface. The first hydrophobic layer includes a polydimethylsiloxane elastomer. The first hydrophobic layer is positioned on the first surface of the base layer. The second hydrophobic layer includes the polydimethylsiloxane elastomer. The second hydrophobic layer is positioned on the second surface of the base layer. The ion exchange membrane is configured to prevent cross contamination of one or more electrolytes used in the redox flow battery.

In some embodiments, the sulfonated poly(ether ether ketone) has a degree of sulfonation ranging from 30% to 80%. In some embodiments, the ion exchange membrane is configured to allow permeation of protons and hydroxide ions. In some embodiments, the base layer has a thickness ranging from 30 microns to 600 microns. In some embodiments, each of the first hydrophobic layer and the second hydrophobic layer has a thickness ranging from 1 micron to 2 microns.

Embodiments of the disclosure also provide a method for preparing an ion exchange membrane for used in a redox flow battery. The method includes the step of preparing a base layer including sulfonated poly(ether ether ketone) by casting a first solution including a first solvent and the sulfonated poly(ether ether ketone) and removing the first solvent. The base layer has a first surface and a second surface. The method includes the step of applying an uncured polydimethylsiloxane to the base layer by immersing the base layer in a second solution including a second solvent and the uncured polydimethylsiloxane such that the uncured polydimethylsiloxane is applied on the first surface and the second surface. The method includes the step of curing the uncured polydimethylsiloxane and removing the second solvent to form the ion exchange membrane.

In some embodiments, the first solvent includes dimethyl sulfoxide, N,N-dimethylformamide, N,N-demethyl acetamide, or N-methyl-2-pyrrolidone, chloroform. In some embodiments, the second solvent includes cyclohexane, n-hexane, or tetrahydrofuran.

In some embodiments, the method further includes the step of preparing the sulfonated poly(ether ether ketone) by sulfonating poly(ether ether ketone) using a sulfur-based acid. In some embodiments, the sulfur-based acid is sulfuric acid. In some embodiments, the sulfuric acid has a concentration ranging from 95% to 98%.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of the disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words, including "uphole," "downhole" and other like terms, are for descriptive convenience and are not limiting unless otherwise indicated.

As used throughout the disclosure, the term "catholyte" refers to an electrolyte on a cathodic half-cell of an electrochemical cell. Conversely, as used throughout the disclosure, the term "anolyte" refers to an electrolyte on an anodic half-cell of the electrochemical cell.

As used throughout the disclosure, the term "degree of sulfonation" refers to the ratio between the monomer units of sulfonated poly(ether ether ketone) (SPEEK) and the monomer units of the initial poly(ether ether ketone) (PEEK) before undergoing a sulfonation reaction.

Embodiments of the disclosure are generally directed to an RFB. More specifically, embodiments of the disclosure are directed to a device and method for an IEM used in an RFB. The RFB includes an electrochemical cell having two half-cells separated by the IEM. The cathodic half-cell includes an electrolyte solution of $Fe^{2+}/Fe^{3+}$ and the anodic half-cell includes an electrolyte solution of $V^{3+}/V^{2+}$. The IEM includes a SPEEK membrane coated with a polydimethylsiloxane (PDMS) elastomer.

Figure 1:
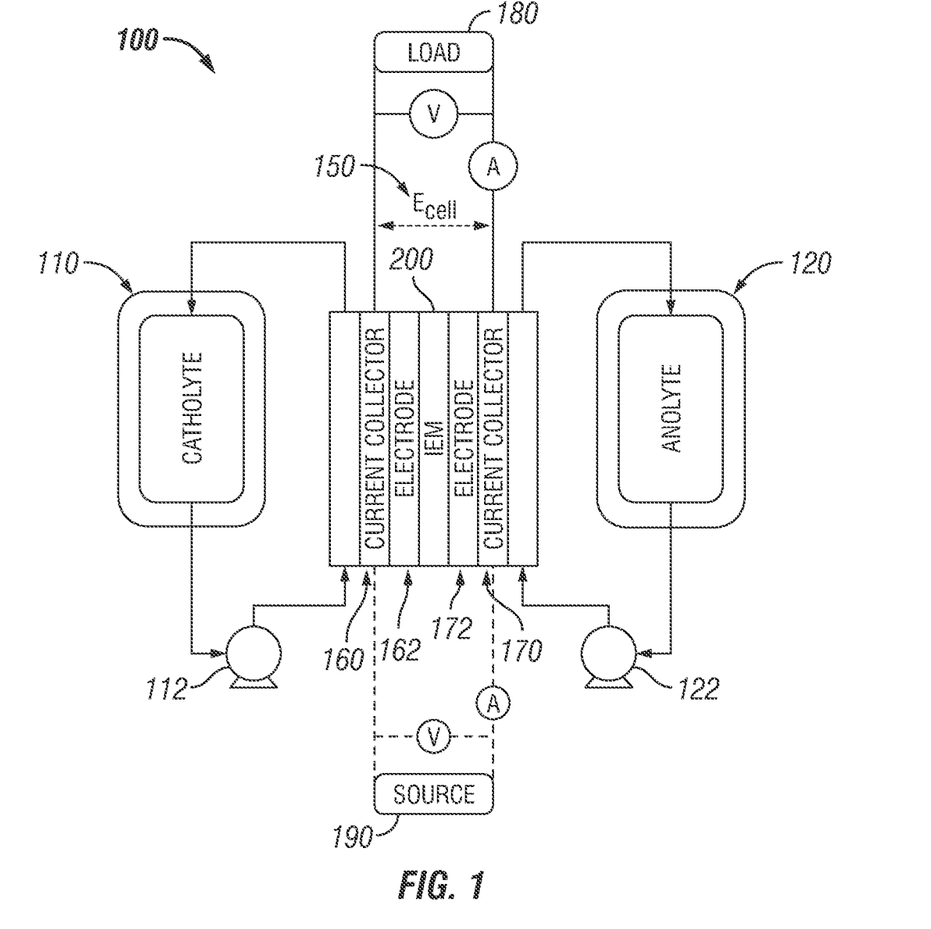
FIG. 1 is a schematic representation of an RFB in accordance with at least one embodiment of the disclosure.

FIG. 1 shows an RFB 100 in accordance with at least one embodiment of the disclosure. The RFB 100 includes a catholyte reservoir 110 from which a catholyte solution is circulated by a pump 112 through a cathodic half-cell 160 of an electrochemical cell 150 such that fresh or regenerated catholytes are supplied to the cathodic half-cell 160 as the redox reaction takes place. The RFB 100 also includes an anolyte reservoir 120 from which an anolyte solution is circulated by a pump through an anodic half-cell 170 of the electrochemical cell 150 such that fresh or regenerated anolytes are supplied to the anodic half-cell 170 as the redox reaction takes place. The cathodic half-cell and the anodic half-cell are separated by an IEM 200. The cathodic half-cell 160 includes electrode 162 in contact with the catholyte solution. The anodic half-cell 170 includes electrode 172 in contact with the anolyte solution. Electrodes 162, 172 can be electrically connected to a load 180 during discharging of the RFB 100 to supply electrical energy to the load 180. More than one electrochemical cells 150 can be stacked in a serial manner such that an increased voltage can be provided to the load 180. More than one electrochemical cells 150 can be stacked in a parallel manner such that an increased current can be provided to the load 180. Conversely, electrodes 162, 172 can be electrically connected to an external power source 190 during charging of the RFB 100 to receive electrical energy from the external power source 190.

In some embodiments, the RFB 100 is an iron/vanadium (Fe/V) RFB. The cathodic half-cell 160 is based on a $Fe^{2+}/Fe^{3+}$ redox couple where the catholyte solution includes electrolytes such as ions of $Fe^{2+}$, $Fe^{3+}$, or both. The catholyte can exist in an acidic environment having a pH of less than about 6, alternately less than about 4, or alternately less than about 2. The anodic half-cell 170 is based on a $V^{3+}/V^{2+}$ redox couple where the anolyte solution includes electrolytes such as ions of $V^{3+}$, $V^{2+}$, or both. The anolyte can exist in an acidic environment having a pH of less than about 6, alternately less than about 4, or alternately less than about 2. In other embodiments, the RFB 100 can be a VRFB using vanadium of various oxidation states. Still in other embodiments, the RFB 100 can include a combination of two half-cells, where each half-cell is based on a redox couple having metal ions of vanadium, iron, bromine, zinc, chromium, titanium, magnesium, cerium, lead, nickel, *neptunium*, or uranium. Table 1 shows non-limiting example RFB 100 systems that can be utilized in embodiments of this disclosure.

TABLE 1

| RFB System | Half-Cells/Electrolytes | Electrode Materials |
| --- | --- | --- |
| Iron Chromium | $CrCl_3$ in HCl; $FeCl_2$ in HCl | Carbon felt with traces of gold and lead (Cr half-cell); carbon felt (Fe half-cell) |
| All-Vanadium | Vanadyl sulfate in $H_2SO_4$ | Graphite felt heat bonded on carbon-filled polyethylene conducting plastic bipolar substrates |
| Vanadium Bromine | Vanadium bromide in HBr and HCl | Carbon or graphite felt bonded onto conductive plastic sheets |
| Magnesium Vanadium | Mn(II)/Mn(III) in $H_2SO_4$; V(III)/V(II) in $H_2SO_4$ | Polyacrylonitrile (PAN) based carbon felt or spectral pure graphite electrodes |
| Vanadium Cerium | Ce(III) in $H_2SO_4$; V(III) in $H_2SO_4$ | Carbon fibers |
| Vanadium Glyoxal(O2) | Glyoxal in HCl; V(III) in $H_2SO_4$ | Graphite plates and porous graphite felts |
| Vanadium Cystine(O2) | Cystine in HBr; V(III) in $H_2SO_4$ | Graphite plates |
| Vanadium Polyhalide | NaBr in HCl; $VCl_3$ in HCl | Graphite felt |
| Vanadium Acetylacetonate | V(III) acetylacetonate in tetraethylammonium tetrafluoroborate/$CH_3CN$ | Graphite |
| Vanadium Air | $H_2O/O_2$; V(III)/V(II) in $H_2SO_4$ | Titanium |
| Bromine Polysulfide | NaBr saturated with $Br_2$ and $Na_2S$ | Activated carbon/polyolefin pressed electrodes or nickel foam/carbon felt |
| Zinc Bromine | $ZnBr_2$; $Br_2$ | Carbon |
| Zinc Cerium | $Ce_2(CO_3)_3$ and ZnO in methane sulfonic acid | Carbon plastic; platinized titanium mesh |

TABLE 1-continued

| RFB System | Half-Cells/Electrolytes | Electrode Materials |
| --- | --- | --- |
| Soluble Lead-Acid | Soluble lead (II) species in methanesulfonic acid | Reticulated vitreous carbon; reticulated nickel |
| All-Neptunium | Neptunium in $HNO_3$ | Pyrolytic graphite and plastic formed carbon |
| All-Chromium | Chromium EDTA complex in HCl | Graphite felt |
| Zinc Air | ZnO in KOH; propanol in KOH | Sintered nickel |
| Zinc Nickel | ZnO in KOH | Inert metal such as nickel foil; nickel oxide |
| All-Uranium | U(VI)/U(V) b-diketonate; U(IV)/U(III) b-diketonate | Platinum |
| Iron Vanadium | $FeCl_2$ in HCl; $VOSO_4$ in HCl | Carbon |

When the Fe/V RFB 100 is being discharged, in the cathodic half-cell 160, $Fe^{2+}$ ions in the catholyte solution are converted to $Fe^{3+}$ ions while releasing electrons ($e^-$) according to the half-reaction in Equation (1):

(1)

where E° refers to the standard electrode potential in Volts (V). In the anodic half-cell 170, $V^{3+}$ ions in the anolyte solution are converted to $V^{2+}$ ions by receiving electrons according to the half-reaction in Equation (2):

(2)

A standard voltage of 1.03 V can be obtained in the electrochemical cell 150 by combining the two half-reactions. Accordingly, electric energy converted from chemical energy is provided to the load 180.

Conversely, when the Fe/V RFB 100 is being charged, in the cathodic half-cell 160, $Fe^{3+}$ ions in the catholyte solution are converted to $Fe^{2+}$ ions by receiving electrons from the external power source 190 according to the reverse half-reaction in Equation (1). The $Fe^{3+}$ ions can be the product of the redox reaction during discharge. The $Fe^{3+}$ ions can be pre-dissolved along with the $Fe^{2+}$ ions when preparing the catholyte solution. In the anodic half-cell 170, $V^{2+}$ ions in the anolyte solution are converted to $V^{3+}$ ions while releasing electrons according to the reverse half-reaction in Equation (2). The $V^{2+}$ ions can be the product of the redox reaction during discharge. The $V^{2+}$ ions can be pre-dissolved along with the $V^{3+}$ ions when preparing the anolyte solution. Accordingly, electric energy supplied by the external power source 190 is converted to chemical energy.

In some embodiments, the catholyte solution is prepared by dissolving a salt form of $Fe^{2+}$. The salt form of $Fe^{2+}$ includes iron(II) chloride ($FeCl_2$). The concentration of the $Fe^{2+}$ may range from about 0.1 M to about 6 M, alternately from about 0.2 M to about 3 M, or alternately from about 1 M to about 2 M. In at least one embodiment, the concentration of the $Fe^{2+}$ is about 1.5 M. The catholyte solution can include a salt form of $Fe^{3+}$. The salt form of $Fe^{3+}$ includes iron(III) chloride ($FeCl_3$). The concentration of the $Fe^{3+}$ may range from about zero to about 6 M, alternately from about 0.2 M to about 3 M, or alternately from about 1 M to about 2 M. The catholye solution can also include an acid. The acid can include a strong inorganic acid such as hydrochloric acid (HCl), hydrobromic acid (HBr), sulfuric acid ($H_2SO_4$), and nitric acid ($HNO_3$). The concentration of the acid may range from about 0.1 M to about 6 M, alternately from about 0.2 M to about 3 M, or alternately from about 1 M to about 2 M. In at least one embodiment, the concentration of the acid is about 3 M.

In some embodiments, the anolyte solution is prepared by dissolving a salt form of $V^{3+}$. The salt form of $V^{3+}$ includes vanadium(III) chloride ($VCl_3$). The concentration of the $V^{3+}$ may range from about 0.1 M to about 6 M, alternately from about 0.2 M to about 3 M, or alternately from about 1 M to about 2 M. In at least one embodiment, the concentration of the $V^{3+}$ is about 1.5 M. The anolyte solution can include a salt form of $V^{2+}$. The salt form of $V^{2+}$ includes vanadium(II) chloride ($VCl_2$). The concentration of the $V^{2+}$ may range from about zero to about 6 M, alternately from about 0.2 M to about 3 M, or alternately from about 1 M to about 2 M. The anolyte solution can also include an acid. The acid can include a strong inorganic acid such as HCl, HBr, $H_2SO_4$, and $HNO_3$. The concentration of the acid may range from about 0.1 M to about 6 M, alternately from about 0.2 M to about 3 M, or alternately from about 1 M to about 2 M. In at least one embodiment, the concentration of the acid is about 3 M.

In some embodiments, the electrodes 162, 172 can include any suitable electrode material known in the art. Non-limiting examples of the electrode material can include carbon (including graphite), titanium, and nickel. The electrodes 162, 172 can have any suitable shape as long as they are in contact with the electrolyte solution. For example, the electrodes 162, 172 can be planar, cylindrical, or hexahedral. As shown in FIG. 1, planar electrodes 162, 172 can be stacked on both sides of the IEM 200.

In some embodiments, the Fe/V RFB 100 can be operated at a current density ranging from about 8 milliamperes per square centimeter ($mA/cm^2$) to about 250 $mA/cm^2$, alternately from about 30 $mA/cm^2$ to about 130 $mA/cm^2$, or alternately from about 40 $mA/cm^2$ to about 60 $mA/cm^2$. The temperature of the catholyte solution and the anolyte solution can range from about 0 deg. C. to about 100 deg. C., alternately from about 20 deg. C. to about 80 deg. C., or alternately from about 30 deg. C. to about 60 deg. C.

Figure 2:
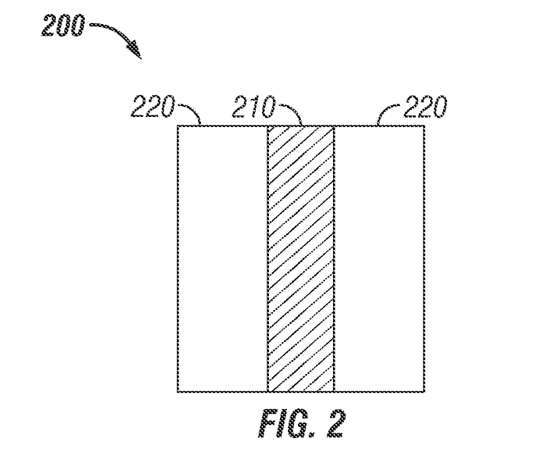
FIG. 2 is a schematic representation of an IEM used in an RFB in accordance with at least one embodiment of the disclosure.

FIG. 2 shows the IEM 200 used in an RFB 100 in accordance with at least one embodiment of the disclosure. The IEM 200 separates the cathodic half-cell 160 and the anodic half-cell 170 inhibiting cross contamination of the catholyte or the anolyte, or both. In this manner, short-circuiting can be prevented. In addition, the IEM 200 can allow electroactive species such as dissolved protons ($H^+$) or hydroxide ions ($OH^-$) to permeate from one side to the other to complete the electric circuit. The IEM 200 does not allow solvents such as water to permeate from one side to the other. Moreover, the IEM 200 exhibits about zero to scarce swelling.

The IEM 200 includes a base layer 210. The base layer 210 has a thickness ranging from about 30 microns to about 600 microns, alternately from about 100 microns to about 400 microns, or alternately from about 150 microns to about 300 microns. The base layer 210 includes SPEEK. The SPEEK used in the base layer 210 has a degree of sulfonation ranging from about 30% to about 80%, alternately from about 40% to about 70%, or alternately from about 50% to about 60%.

In an example embodiment of the method, the SPEEK used in the base layer 210 can be obtained from PEEK by undergoing a sulfonation reaction. The sulfonation reaction involves dissolving PEEK in a sulfur-based acid. Non-limiting example sulfur-based acids include sulfuric acid, sulfurous acid, disulfuric acid, peroxymonosulfuric acid, peroxydisulfuric acid, dithionic acid, thiosulfuric acid, disulfurous acid, dithionous acid, sulfoxylic acid, polythionic acid, thiosulfurous acid, and dihydroxydisulfane. In at least one embodiment, the sulfur-based acid is sulfuric acid. The sulfuric acid can have a concentration ranging from about 50% to about 100%, alternately from about 90% to about 99%, or alternately from about 95% to about 98%.

In some embodiments, the SPEEK used in the base layer 210 has a porosity value of less than about 5%, alternately less than about 3%, or alternately less than about 1%. In at least one embodiment, the SPEEK used in the base layer 210 is a dense material having a porosity value of about zero.

In an example embodiment of the method, the SPEEK base layer 210 can be prepared by a casting method. A SPEEK casting solution including a solvent and SPEEK can be casted on a substantially planar surface. The casted SPEEK is subsequently heated or dried, or both, to remove the solvent. Non-limiting example solvents used in the SPEEK casting solution include dimethyl sulfoxide (DMSO), N,N-dimethylformamide (DMF), N,N-demethyl acetamide (DMAc), N-methyl-2-pyrrolidone (NMP), and chloroform ($CHCl_3$). The SPEEK base layer 210 can be subsequently peeled off from the substantially planar surface.

The IEM 200 includes one or more hydrophobic layers 220. In some embodiments, the IEM 200 can have one hydrophobic layer 220 positioned on one surface of the SPEEK base layer 210. In other embodiments, the IEM 200 can have two hydrophobic layers 220 positioned on each surface of the SPEEK base layer 210. The hydrophobic layer 220 has a thickness ranging from about 1 micron to about 10 microns, alternately from about 2 microns to about 6 microns or alternately from about 3 microns to about 4 microns. The hydrophobic layer 220 includes a PDMS elastomer.

In some embodiments, the PDMS elastomer used in the hydrophobic layer 220 has a porosity value of less than about 5%, alternately less than about 3%, or alternately less than about 1%. In at least one embodiment, the PDMS elastomer used in the hydrophobic layer 220 is a dense material having a porosity value of about zero.

In an example embodiment of the method, the PDMS elastomer used in the hydrophobic layer 220 is in an uncured form that can be applied onto the SPEEK base layer 210. The SPEEK base layer 210 can be immersed in an uncured PDMS solution including a solvent and the uncured PDMS. The coated uncured PDMS is subsequently heated or dried, or both, to remove the solvent and to cure the uncured PDMS to form the PDMS elastomer hydrophobic layer 220. Non-limiting example solvents used in the uncured PDMS solution include cyclohexane, n-hexane, and tetrahydrofuran (THF).

EXAMPLES

The disclosure is illustrated by the following examples, which are presented for illustrative purposes only, and are not intended as limiting the scope of the invention which is define by the appended claims.

Example 1

Figure 3:
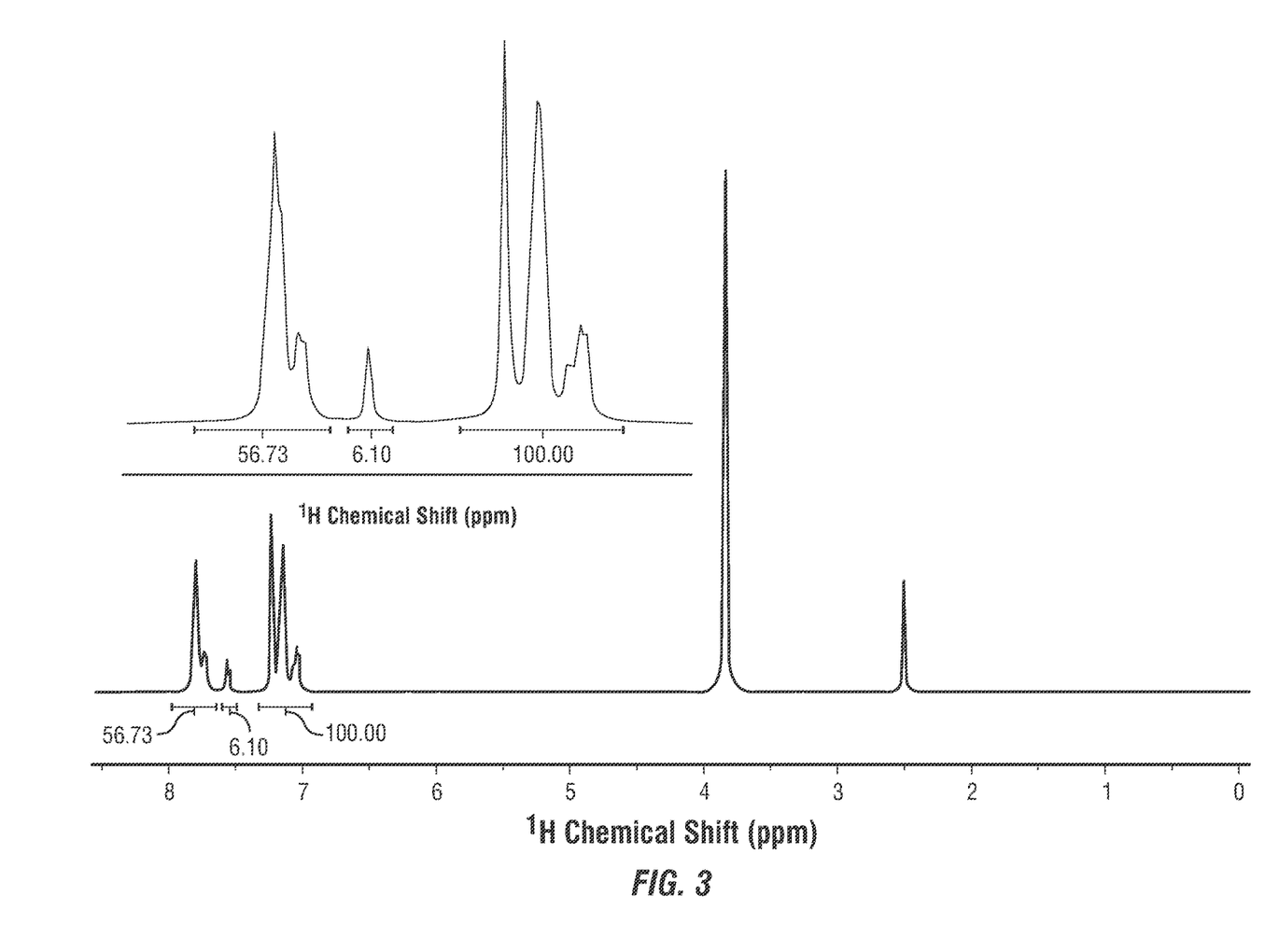
FIG. 3 is a graphical representation showing a $^1$H nuclear magnetic resonance (NMR) spectrum of a SPEEK sample in accordance with at least one embodiment of the disclosure.

A SPEEK sample was prepared. A sample of PEEK 450P pellets (Victrex Europa GmbH, Hofheim am Taunus, Germany) was dried in vacuum at about 90 deg. C. overnight. 20 grams (g) of the PEEK 450P sample were dissolved in one liter (L) of about 95-98% concentrated sulfuric acid to form a PEEK polymer solution and were vigorously stirred at room temperature for about one hour. The temperature of the PEEK polymer solution was maintained at about 50 deg. C. for about 5 hours. The PEEK polymer solution was let to precipitate in an ice-cold water environment under mechanical agitation. The polymer precipitate (that is, SPEEK) was filtered and washed multiple times with distilled water until the pH reached about 7. The washed SPEEK was dried in vacuum at about 90 deg. C. for about 12 hours. $^1$H NMR was conducted to determine the degree of sulfonation of the yielded SPEEK sample. The results are shown in FIG. 3, where the degree of sulfonation of the yielded SPEEK sample was about 43% (100.00%-56.73%).

Example 2

A SPEEK membrane sample was prepared using casting and solvent evaporation methods. The SPEEK sample obtained in Example 1 was dissolved in DMSO to form a SPEEK polymer solution having about 2-3 wt. % of SPEEK. The SPEEK polymer solution was filtered through a 0.45 micron filter. The SPEEK polymer solution was casted on a dry clean petri dish and left to dry at room temperature under a nitrogen environment overnight. The resulting SPEEK membrane was heated under a nitrogen flow at about 60 deg. C. for about 24 hours. The temperature of the SPEEK membrane was maintained at about 60 deg. C. in vacuum for about 24 hours. The temperature of the SPEEK membrane was maintained at about 120 deg. C. in vacuum overnight to remove any residual solvent. The SPEEK membrane was cooled to room temperature and peeled off from the petri dish. The peeled-off SPEEK membrane was dried at room temperature under a nitrogen environment for about 8 hours. The thickness of the SPEEK membrane ranged from about 30 microns to about 600 microns. The diameter of the SPEEK membrane ranged from about 7 centimeters (cm) to about 10 cm. The surface area of the SPEEK membrane ranged from about 39 square centimeters ($cm^2$) to about 80 $cm^2$.

Example 3

An IEM sample was prepared. A PDMS casting solution having about 1 wt. % of PDMS was prepared by mixing parts A and B of the PDMS (Sylgard™ 184 silicone elastomer, Dow Corning Corp., Midland, Mich.) with cyclohexane at a ratio of about 9:1. The SPEEK membrane sample prepared in Example 2 was immersed in the PDMS casting solution for about 5 minutes at room temperature. The resulting IEM sample having a PDMS-coated SPEEK membrane was taken out from the PDMS casting solution, where the IEM sample was dried at room temperature under a nitrogen environment overnight. The IEM sample was heated at about 60 deg. C. under a nitrogen flow for about 24 hours to allow the PDMS layer to cure. The temperature of the IEM sample was maintained at 120 deg. C. for about 24 hours to ensure complete curing of the PDMS layer. The curing process involves crosslinking of silicone hydride and vinyl-terminated silicone in the presence of a platinum catalyst where active hydrogens of the Si—H bond attack the vinyl groups to form Si—C bonds. Crosslinking between the SPEEK membrane and the PDMS layer was not observed. The thickness of the PDMS layer ranged from about 1 micron to about 6 microns. The PDMS layer was coated on both surfaces of the SPEEK membrane. The diameter of the PDMS-coated SPEEK membrane ranged from about 7 cm to about 10 cm. The surface area of the PDMS-coated SPEEK membrane ranged from about 39 cm$^2$ to about 80 cm$^2$.

Example 4

A sample RFB was prepared. The electrochemical cell of the sample RFB included two half-cells each containing an electrolyte reservoir. The catholyte half-cell and the anolyte half-cell were separated by the IEM sample prepared in Example 3. Two graphite felt electrodes (G200, AvCarb Material Solutions, Lowell, Mass.) having a thickness of about 6.5 mm and a surface area of about 13.7 cm$^2$ were in contact with the IEM sample on each side. The compression ratio of the graphite felt electrodes in the sample RFB was about 15%. The catholyte reservoir included a catholyte solution having about 1.5 M iron(II) chloride (FeCl$_2$) and about 3 M hydrochloric acid (HCl). The anolyte reservoir included an anolyte solution having about 1.5 M vanadium (III) chloride (VCl$_3$) and about 3 M HCl. Each of the catholyte and anolyte solutions was pumped having a linear flow velocity of about 40 centimeters per second (cm/s) at the electrode surface and was circulated back to the corresponding reservoir. Each of the catholyte and anolyte solutions was kept under agitation using a magnetic stirrer over the entire period of the study.

A control RFB was prepared. The electrochemical cell of the control RFB included two half-cells each containing an electrolyte reservoir. The catholyte half-cell and the anolyte half-cell were separated by a Nafion® 117 (MilliporeSigma, St. Louis, Mo.) membrane. The thickness of the Nafion® 117 membrane was about 180 microns. The Nafion® 117 membrane had a square dimension of about 37 mm×37 mm. Two graphite felt electrodes (G200, AvCarb Material Solutions, Lowell, Mass.) having a thickness of about 6.5 mm and a surface area of about 13.7 cm$^2$ were in contact with the Nafion® 117 membrane on each side. The compression ratio of the graphite felt electrodes in the control RFB was about 15%. The catholyte reservoir included a catholyte solution having about 1.5 M iron(II) chloride (FeCl$_2$) and about 3 M HCl. The anolyte reservoir included an anolyte solution having about 1.5 M vanadium(III) chloride (VCl$_3$) and about 3 M HCl. Each of the catholyte and anolyte solutions was pumped having a linear flow velocity of about 40 cm/s at the electrode surface and was circulated back to the corresponding reservoir. Each of the catholyte and anolyte solutions was kept under agitation using a magnetic stirrer over the entire period of the control study.

Example 5

The degree of cross contamination was measured using the sample RFB and the control RFB prepared in Example 4. Concentration of vanadium was measured in the catholyte reservoir of each of the sample RFB and the control RFB by using inductively coupled plasma mass spectrometry (ICP-MS) which had a metal detection capability as low as one part per quadrillion (ppq). Concentration of iron was measured in the anolyte reservoir of each of the sample RFB and the control RFB using ICP-MS. Measurements were taken at 0, 1, 3, 7, and 15 days.

Figure 4A:
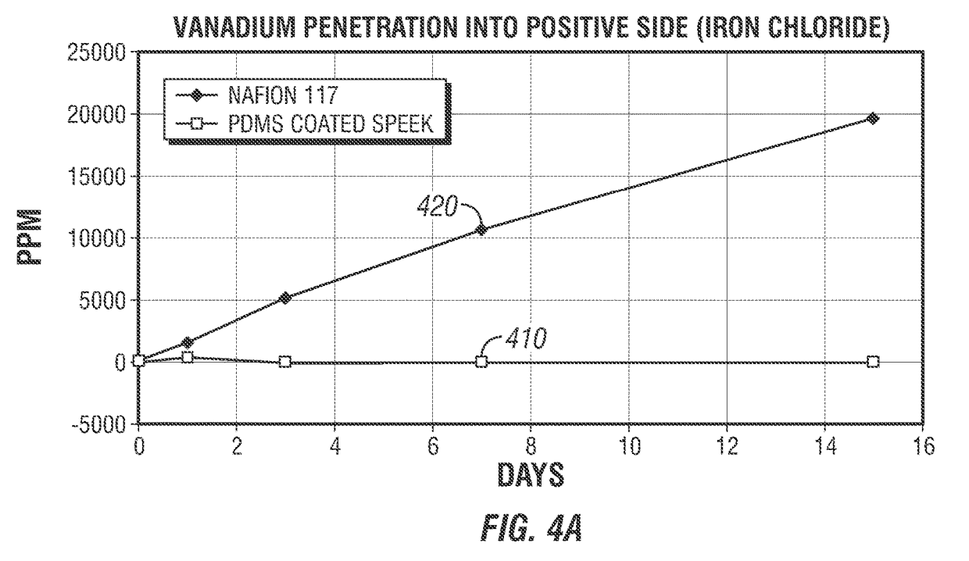
FIG. 4A is a graphical representation showing the degree of vanadium cross contamination in a catholyte reservoir of a sample RFB and a control RFB in accordance with at least one embodiment of the disclosure.
Figure 4B:
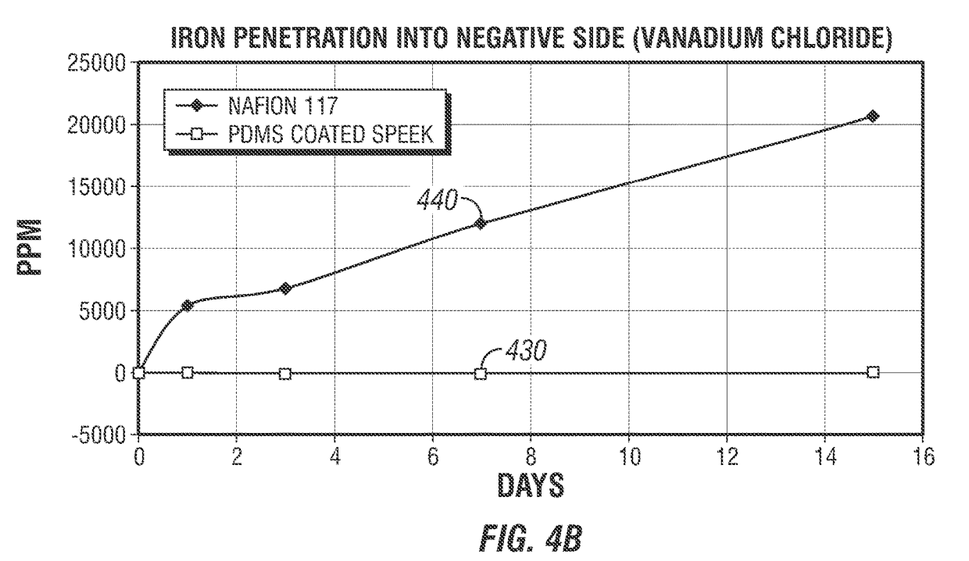
FIG. 4B is a graphical representation showing the degree of iron cross contamination in an anolyte reservoir of the sample RFB and the control RFB in accordance with at least one embodiment of the disclosure.

The results are depicted in FIGS. 4A and B. FIG. 4A is a graphical representation showing the degree of vanadium cross contamination in the catholyte reservoir of the sample RFB and the control RFB in accordance with at least one embodiment of the disclosure. Circular datapoints 410 represent the concentration of vanadium in the catholyte reservoir of the sample RFB in parts per million (ppm) measured at 0, 1, 3, 7, and 15 days. Square datapoints 420 represent the concentration of vanadium in the catholyte reservoir of the control RFB in ppm measured at 0, 1, 3, 7, and 15 days. FIG. 4B is a graphical representation showing the degree of iron cross contamination in the anolyte reservoir of the sample RFB and the control RFB in accordance with at least one embodiment of the disclosure. Circular datapoints 430 represent the concentration of iron in the anolyte reservoir of the sample RFB in ppm measured at 0, 1, 3, 7, and 15 days. Square datapoints 440 represent the concentration of iron in the anolyte reservoir of the control RFB in ppm measured at 0, 1, 3, 7, and 15 days. In both FIGS. 4A and B, the horizontal axes represent time in days and the vertical axes represent concentration in ppm. As shown in both FIGS. 4A and B, the sample RFB having the PDMS-coated SPEEK membrane used as the IEM exhibits about zero to scarce cross contamination. On the other hand, the control RFB having the Nafion® 117 membrane used as the IEM exhibits substantial cross contamination on both the cathoylte and anolyte reservoirs.

Example 6

Figure 5A:
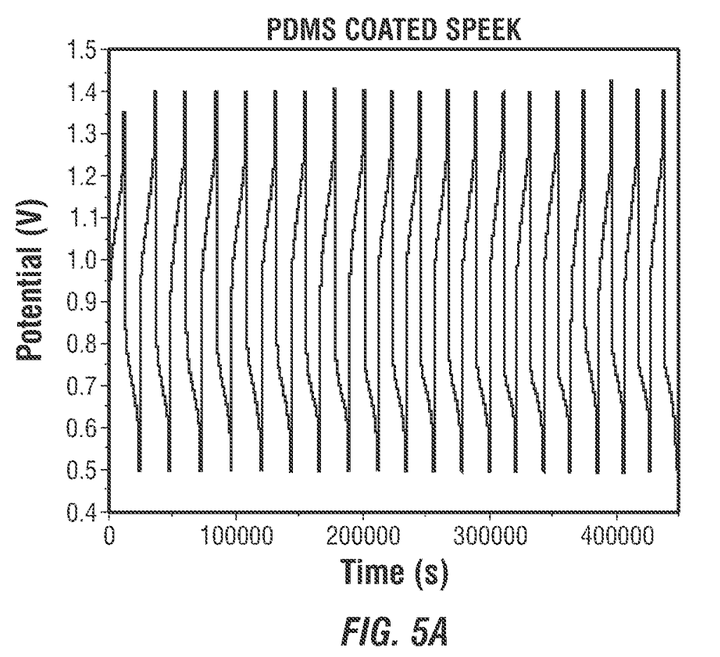
FIG. 5A is a graphical representation showing 20 cycles of charging and discharging of the control RFB in accordance with at least one embodiment of the disclosure.
Figure 5B:
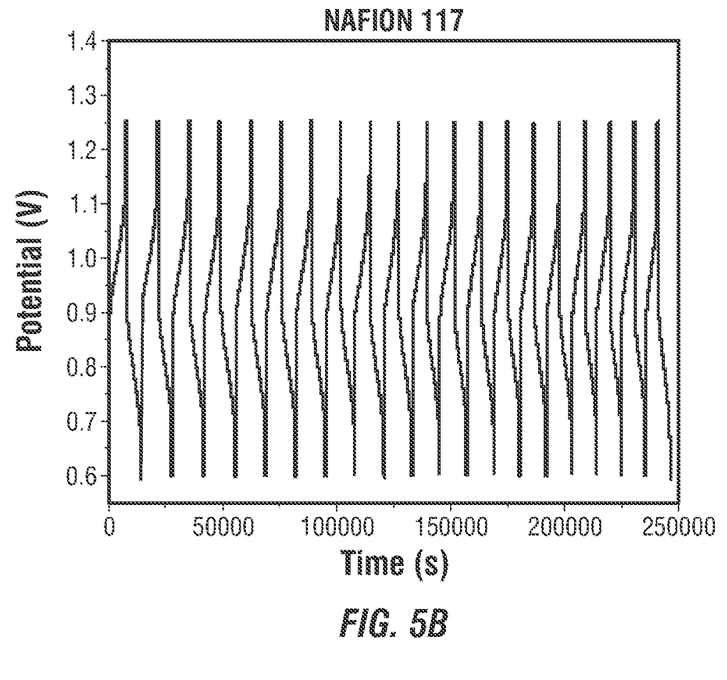
FIG. 5B is a graphical representation showing 20 cycles of charging and discharging of the sample RFB in accordance with at least one embodiment of the disclosure.

Battery stability was studied using the sample RFB and the control RFB prepared in Example 4. Each of the sample RFB and the control RFB underwent 20 cycles of charging and discharging as shown in FIGS. 5A and B. The charging and discharging experiments were conducted using a potentiostat/galvanostat (Metrohm AG, Utrecht, The Netherlands) having a current density of about 51 mA/cm$^2$ at a temperature of about 42 deg. C. FIG. 5A is a graphical representation showing the 20 cycles of charging and discharging of the sample RFB in accordance with at least one embodiment of the disclosure. FIG. 5B is a graphical representation showing the 20 cycles of charging and discharging of the control RFB in accordance with at least one embodiment of the disclosure. In both FIGS. 5A and B, the horizontal axes represent time in seconds and the vertical axes represent electrical potential in Volts.

Figure 6:
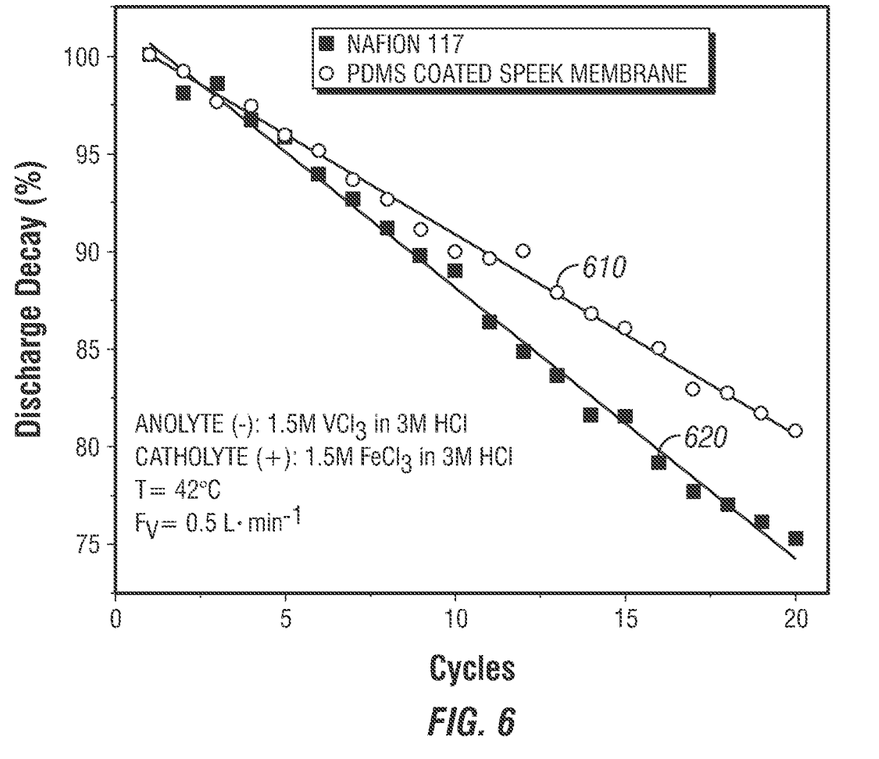
FIG. 6 is a graphical representation showing a decrease in battery capacity during the 20 cycles of charging and discharging shown in FIGS. 5A and B for each of the sample RFB and the control RFB, respectively, in accordance with at least one embodiment of the disclosure.

The results of the battery stability study are depicted in FIG. 6. FIG. 6 shows a decrease in battery capacity (or discharge decay) during the 20 cycles of charging and discharging for each of the sample RFB and the control RFB, respectively, in accordance with at least one embodiment of the disclosure. The horizontal axis represents the number of charging and discharging cycles and the vertical axis represents the discharge decay in percent (%). Circular datapoints 610 represent the discharge decay of the sample RFB. Square datapoints 620 represent the discharge decay of the control RFB. Without being bound by any theory, a contributing factor for the discharge decay is the shortening in duration of the discharging time, which can be a result of cross contamination through the IEM. As shown in FIG. 6, the sample RFB having the PDMS-coated SPEEK membrane used as the IEM exhibits a lesser degree of discharge decay than the control RFB having the Nafion® 117 membrane used as the IEM by about 11% after 20 cycles of charging and discharging. Accordingly, the PDMS-coated SPEEK membrane shows better performance as an IEM than the Nafion® 117 membrane.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A redox flow battery, comprising:
   a first half-cell comprising a first electrolyte, wherein the first electrolyte comprises $Fe^{2+}$;
   a second half-cell comprising a second electrolyte, wherein the second electrolyte comprises $V^{3+}$,
   wherein the first half-cell and the second half-cell are configured to undergo a redox reaction to discharge and charge the redox flow battery; and
   an ion exchange membrane separating the first half-cell and the second half-cell, the ion exchange membrane comprising:
   a base layer comprising sulfonated poly(ether ether ketone), the base layer having a first surface and a second surface, wherein the sulfonated poly(ether ether ketone) is a dense material having a porosity value of about zero; and
   a first hydrophobic layer comprising a polydimethylsiloxane elastomer, the first hydrophobic layer positioned on the first surface of the base layer;
   a second hydrophobic layer comprising the polydimethylsiloxane elastomer, the second hydrophobic layer positioned on the second surface of the base layer,
   wherein the ion exchange membrane is configured to prevent cross contamination of the first electrolyte and the second electrolyte.

2. The redox flow battery of claim 1, wherein the $Fe^{2+}$ has a concentration ranging from 0.5 M to 2.5 M.

3. The redox flow battery of claim 1, wherein the first electrolyte has a pH of less than 2.

4. The redox flow battery of claim 1, wherein the $V^{3+}$ has a concentration ranging from 0.5 M to 2.5 M.

5. The redox flow battery of claim 1, wherein the second electrolyte has a pH of less than 2.

6. The redox flow battery of claim 1, further comprising:
   a first electrolyte reservoir fluidly connected to the first half-cell such that the first electrolyte is circulated between the first electrolyte reservoir and the first half-cell; and
   a second electrolyte reservoir fluidly connected to the second half-cell such that the second electrolyte is circulated between the second electrolyte reservoir and the second half-cell.

7. The redox flow battery of claim 1, wherein the redox flow battery provides an electric potential ranging from 0.5 V to 2.5 V during discharge.

8. An ion exchange membrane for use in a redox flow battery, comprising:
   a base layer comprising sulfonated poly(ether ether ketone), the base layer having a first surface and a second surface, wherein the sulfonated poly(ether ether ketone) is a dense material having a porosity value of about zero; and
   a first hydrophobic layer comprising a polydimethylsiloxane elastomer, the first hydrophobic layer positioned on the first surface of the base layer;
   a second hydrophobic layer comprising the polydimethylsiloxane elastomer, the second hydrophobic layer positioned on the second surface of the base layer,
   wherein the ion exchange membrane is configured to prevent cross contamination of one or more electrolytes used in the redox flow battery.

9. The ion exchange membrane of claim 8, wherein the sulfonated poly(ether ether ketone) has a degree of sulfonation ranging from 30% to 80%.

10. The ion exchange membrane of claim 8, wherein the ion exchange membrane is configured to allow permeation of protons and hydroxide ions.

11. The ion exchange membrane of claim 8, wherein the base layer has a thickness ranging from 30 microns to 600 microns.

12. The ion exchange membrane of claim 8, wherein each of the first hydrophobic layer and the second hydrophobic layer has a thickness ranging from 1 micron to 2 microns.

* * * * *